United States Patent
Ninomiya et al.

(10) Patent No.: US 7,706,305 B2
(45) Date of Patent: Apr. 27, 2010

(54) NETWORK SYSTEM FOR VESSEL INSTRUMENTS

(75) Inventors: Akira Ninomiya, Nishinomiya (JP); Kentaro Tsudaka, Nishinomiya (JP); Suenobu Hase, Nishinomiya (JP)

(73) Assignee: Furuno Electric Co., Ltd, Nishinomiya (JP)

( * ) Notice: Subject to any disclaimer, the term of this patent is extended or adjusted under 35 U.S.C. 154(b) by 50 days.

(21) Appl. No.: 12/201,951

(22) Filed: Aug. 29, 2008

(65) Prior Publication Data

US 2009/0099764 A1 Apr. 16, 2009

(30) Foreign Application Priority Data

Aug. 30, 2007 (JP) ............................. 2007-223624

(51) Int. Cl.
*H04L 12/26* (2006.01)
(52) U.S. Cl. .......................... 370/254; 370/400; 701/29
(58) Field of Classification Search ........................ None
See application file for complete search history.

(56) References Cited

U.S. PATENT DOCUMENTS

| | | | |
|---|---|---|---|
| 6,273,771 B1 | 8/2001 | Buckley et al. | |
| 7,143,363 B1 | 11/2006 | Gaynor et al. | |
| 2001/0002451 A1* | 5/2001 | Breed | 701/36 |
| 2003/0200015 A1* | 10/2003 | Pillar | 701/33 |
| 2005/0089055 A1 | 4/2005 | Klose et al. | |
| 2005/0288833 A1 | 12/2005 | Motose | |
| 2006/0282297 A1* | 12/2006 | Gordon et al. | 705/7 |
| 2009/0210074 A1* | 8/2009 | Lill et al. | 700/19 |

FOREIGN PATENT DOCUMENTS

| | | |
|---|---|---|
| EP | 1 494 417 A2 | 1/2005 |
| JP | 2004-150872 | 5/2004 |

* cited by examiner

*Primary Examiner*—Min Jung
(74) *Attorney, Agent, or Firm*—Birch, Stewart, Kolasch & Birch, LLP

(57) ABSTRACT

A network system where vessel instruments including sensors are connected through a communication network is provided. The sensors generate the same type of navigation data. The system includes a first network for realizing one-to-many communication, a first group instruments connected with each other through the first network, and a second group instruments connected to the first network with a different protocol from the first network. The first group instrument is an input/output gate between the second group instruments and the first network. At least one of the first group instruments has a server function. The first group instruments obtain identification information and types of navigation data of the second group instruments using the first group instruments as the gates, and the server-function instrument obtains identification information and types of navigation data of the instruments. The server function instrument selects one of the sensors generating the same type of navigation data, and outputs a sharing instruction of the data of the selected sensor, through the first network. The first group instrument provides the sharing instruction to the second group instruments using the first group instrument as the gate.

6 Claims, 8 Drawing Sheets

NETWORK SYSTEM FOR VESSEL INSTRUMENTS

CROSS-REFERENCE TO RELATED APPLICATION(S)

This application claims priority under 35 U.S.C. §119 to Japanese Patent Application No. 2007-223624, which was filed on Aug. 30, 2007, the entire disclosure of which is hereby incorporated by reference.

TECHNICAL FIELD

The present invention relates to a vessel instrument network system in which vessel instruments, such as a fish finder, a sonar; and a GPS unit, are interconnected through a network.

BACKGROUND

For the convenience of operators and safety of navigation, various detection devices, such as fish finders, sonar; radars, and GPS units are equipped on a vessel, and this type of detection devices are typically interconnected to form a network system on the vessel. Thus, the typical vessel may equip a plurality of the same type of the detection devices.

Japanese Unexamined Patent Application Publication No. 2004-150872 discloses a vessel that includes a plurality of ultrasonic detectors (e.g., fish finders or sonar), and a plurality of indicators for the detectors (the indicator may be integrally provided or may be separately provided to the detection device).

In the vessel instrument network system of Japanese Unexamined Patent Application Publication No. 2004-150872, navigation data generated by the detection devices can be selectively displayed on any of the indicators by a user's selection. Thus, the selection must be made by the user manually, and must be made considering which detection device provides the best possible results, etc. In addition, the detection devices that generate the same type of the navigation data may not be operated at the same time. Therefore, in this case, one of the detection devices must be manually disabled or disconnected from the network, and thereby further requiring the operator to perform troublesome operations.

SUMMARY

In order to address the above-described issues, the present invention provides an improved vessel instrument network system.

According to an aspect of the present invention, a vessel instrument network system in which a plurality of vessel instruments including a plurality of sensors are connected through an electrical communication network is provided. The plurality of sensors generate the same type of navigation data. The vessel instrument network system includes a first communication network for realizing one-to-many communication, a first group of the plurality of the vessel instruments connected with each other through the first communication network, and a second group of the plurality of the vessel instruments connected to the first communication network with a protocol that is different from that of the first communication network. The vessel instrument of the first group is a data input/output gate between the vessel instruments of the second group and the first communication network. At least one of the vessel instruments of the first group has a server function. The vessel instruments of the first group obtain identification information and types of outputable navigation data of the vessel instruments of the second group that use the vessel instruments of the first group as the data input/output gates. The instrument having the server function obtains identification information and types of outputable navigation data of the vessel instruments. The instrument having the server function selects one of the sensors generating the same type of the navigation data, and outputs an instruction to share the navigation data of the selected sensor, through the first communication network. The vessel instrument of the first group provides the sharing instruction to the vessel instruments of the second group that use the vessel instrument of the first group as the data input/output gate.

If the vessel instrument of the first group transmits the same type of the navigation data as the sensor instructed to be shared, through the first communication network, the vessel instrument of the first group may stop the transmission of the navigation data. When the vessel instrument of the first group detects that the sensor instructed to be shared is the vessel instrument of the second group that use the vessel instrument of the first group as the data input/output gate, the vessel instrument of the first group may transmit the navigation data from the sensor instructed to be shared through the first communication network.

At least one of the vessel instruments including the instrument having the server function may include an operation input module for accepting a user's operation input of a selection of the sensors. When the operation input module accepts the operation input selecting one of the sensors generating the same type of the navigation data, the operation input module may cause the at least one of the vessel instruments having the server function to obtain the sensor selecting information. The at least one of the vessel instruments having the server function may instruct the sharing based on the obtained sensor selecting information.

The instrument having the server function may include a navigation data quality detecting module for detecting qualities of the same type of the navigation data. The instrument having the server function may instruct to share the navigation data with the highest quality.

The instrument having the server function may monitor the navigation data from the sensor instructed to be shared. If the instrument having the server function cannot obtain the navigation data over a predetermined time period, the instrument having the server function may switch the sensor from the sensor instructed to be shared to another sensor generating the same type of the navigation data as a new sensor instructed to be shared.

The instrument having the server function may select the another sensor instructed to be shared, from the vessel instruments of the second group other than the group to which the previous sensor instructed to be shared belongs.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION OF THE PREFERRED EMBODIMENT

Hereinafter, a vessel instrument network system of the present invention is illustrated with reference to the appended drawings. As used herein, the term "vessel" may be an arbitrary vessel, such as ships, water craft, boat, submarine, which is a type of water vessel to be used on water surface or submerged.

Figure 1:
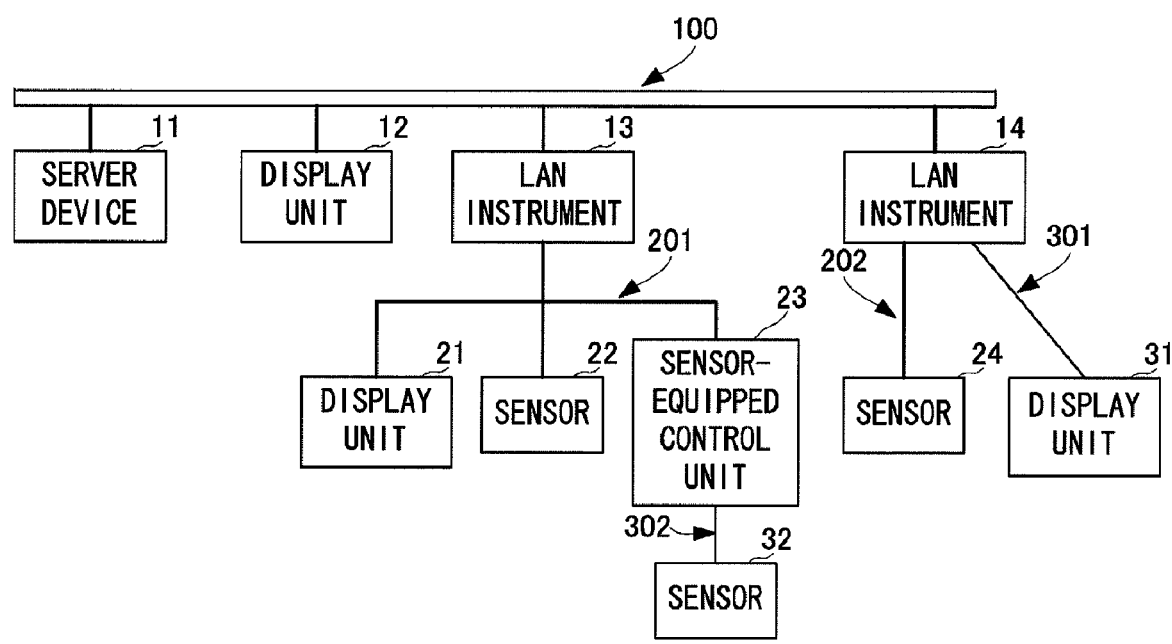
FIG. 1 a block diagram showing a substantial portion of a vessel instrument network system according to an embodiment of the present invention.

FIG. 1 is a block diagram showing a substantial portion of the vessel instrument network system according to an embodiment of the present invention.

The vessel instrument network system of this embodiment includes a first communication network 100 that enables one-to-many communication. The first communication network 100 may be an arbitrary communication network utilizing a communication protocol, such as a local area network (LAN). The first communication network 100 may utilize wired LAN and/or wireless LAN. For example, if utilizing the wireless LAN, it may be based on IEEE802.11 standard. In this embodiment, the first communication network 100 includes, but not limited to, a server device 11, a display unit 12, and two LAN instruments 13 and 14. In this embodiment, data communication between these network instruments is executed in a communication protocol in compliance with LAN. Herein, the server 11, the display unit 12, and the LAN instruments 13 and 14 are referred to as a "first group of the vessel instruments."

The LAN instrument 13 of first group of the vessel instruments is also connected to a second communication network 201 that enables one-to-many communication, with a protocol that is different from the protocol of the first communication network 100. For example, the second communication network 201 may utilize a protocol in compliance with "Controller Area Network (CAN)," which follows the NMEA2000 standard for vessels. In this embodiment, the second communication network 201 includes a display unit 21, a sensor 22, and a sensor-equipped control unit 23, that are NMEA2000 instruments. The LAN instrument 13, the display unit 21, the sensor 22, and the sensor-equipped control unit 23 of the second group communicate with each other by the protocol in compliance with the NMEA2000 standard.

In this embodiment, the sensor-equipped control unit 23 of the second group is also connected to a sensor 32 that is a NMEA0183 instrument for vessels through a serial cable 302. Thus, the sensor-equipped control unit 23 and the sensor 32 perform a serial communication in compliance with the NMEA0183 standard. The serial communication may be realized by a USB interface, a RS-232 interface, etc.

The LAN instrument 14 of the first group is also connected to a sensor 24 that is a NMEA2000 instrument, through a third communication network 202 in compliance with NMEA2000 standard. Thus, the LAN instrument 14 and the sensor 24 communicate with each other in compliance with the NMEA2000 standard. The LAN instrument 14 is also connected to a display unit 31 that is a NMEA0183 instrument for vessels through a serial cable 301. The LAN instrument 14 and the display unit 31 perform a serial communication in compliance with the NMEA0183 standard.

Typically, an unique identification ID is assigned in advance to each of the vessel instruments 11-14, 21-24, 31 and 32 that constitute the vessel instrument network system. For example, the server device 11, the display unit 12, and LAN instruments 13 and 14 on the first communication network 100 each has an individual ID in compliance with the protocol of the first communication network 100.

Further, the LAN instrument 13, the display unit 21, the sensor 22, and the sensor-equipped control unit 23 that are connected to the second communication network 201 each has an individual ID in compliance with the protocol of the second communication network 201. The LAN instrument 13 converts the IDs of the display unit 21, the sensor 22, and the sensor-equipped control unit 23 connected to the second communication network 201 into an ID format of the first communication network 100 to provide them to the respective devices that are connected to the first communication network 100. The sensor 32 is provided with an individual ID from the sensor-equipped control unit 23 that is connected to the second communication network 201. The individual ID of the sensor 32 is also converted into an ID format of the first communication network 100 by the LAN instrument 13 to provide it to the respective devices that are connected to the first communication network 100.

Further, the LAN instrument 14 and the sensor 24 that are connected to the third communication network 202 each has an individual ID in compliance with the protocol of the third communication network 202. The LAN instrument 14 converts the individual ID of the sensor 24 connected to the third communication network 202 into an ID format of the first communication network 100 to provide it to the respective devices that are connected to the first communication network 100. The display unit 31 is provided with an individual ID from the LAN instrument 14. The individual ID of the display unit 31 is also converted into an ID format of the first communication network 100 by the LAN instrument 14 to provide it to the respective devices that are connected to the first communication network 100.

As well as the individual ID, classified-by-type information indicating a type of outputable navigation data (e.g., longitude/latitude data, etc.) is set to each of the vessel instruments. Each of the vessel instruments connected to the first communication network 100, the second communication network 201, and the third communication network 202 store the corresponding classified-by-type information in advance, although the classified-by-type information for the instrument on one network has a different protocol type from the other instruments on the other networks.

The vessel instruments connected to the first communication network 100 transmit/receive the classified-by-type information in the format in compliance with the first communication network 100. The LAN instrument 13 that functions as a data input/output gate between the first communication network 100 and the second communication network 201 converts the classified-by-type information of the display unit 21, the sensor 22, and the sensor-equipped control unit 23 connected to the second communication network 201 into the format of the first communication network 100 to provide them to the respective devices connected to the first communication network 100. The sensor 32 is set with the classified-by-type information by the sensor-equipped control unit 23 connected to the second communication network 201. The classified-by-type information of the sensor 32 is also converted into the format of the first communication network 100 by the LAN instrument 13 to be provided to the respective devices connected to the first communication network 100.

The LAN instrument 14 that functions as a data input/output gate between the first communication network 100 and the third communication network 202 converts the classified-by-type information of the sensor 24 connected to the third communication network 202 into the format of the first communication network 100 to provides it to the respective devices connected to the first communication network 100. The LAN instrument 14 sets the classified-by-type information of the display unit 31 that is serially connected to the LAN instrument 14. The classified-by-type information of the display unit 31 is also converted into the format of the first communication network 100 by the LAN instrument 14 to be provided to the respective devices connected to the first communication network 100.

With such a configuration described above, the vessel instrument network system of this embodiment realizes sharing of the navigation data using the following procedures. In the description below, although simply referred to as "navigation data," the navigation data may include positional data of a positioning device, such as a GPS receiver and a LORAN receiver, as described above. The navigation data may also include vessel heading data of a gyro device or data on vessel's motion, such as pitching, rolling, and heave, over-the-ground/through-the-water vessel speed data of a vessel speed gauge, water depth data of an echo sounder, water temperature data of a water temperature gauge, wind direction/wind speed data of a wind direction/wind speed gauge, various data of an engine, rudder angle data of a rudder angle indicator, detected image data of a radar, a fish finder, and a scanning sonar; other vessels information from an AIS receiver, etc., weather information from a weather facsimile, etc.

Figure 2:
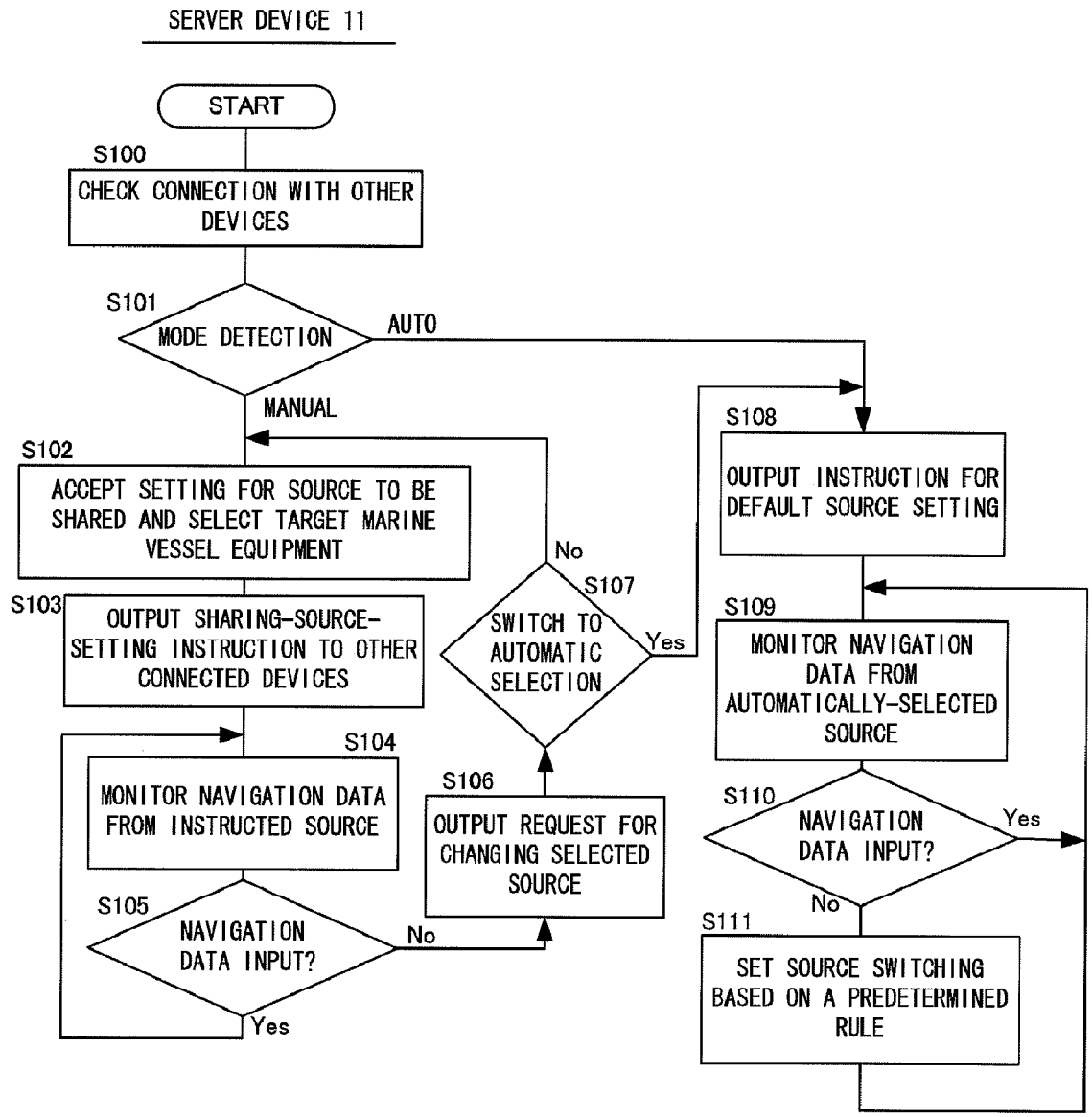
FIG. 2 a flowchart showing a process flow of a server device 11 upon a navigation data sharing process.
Figure 3:
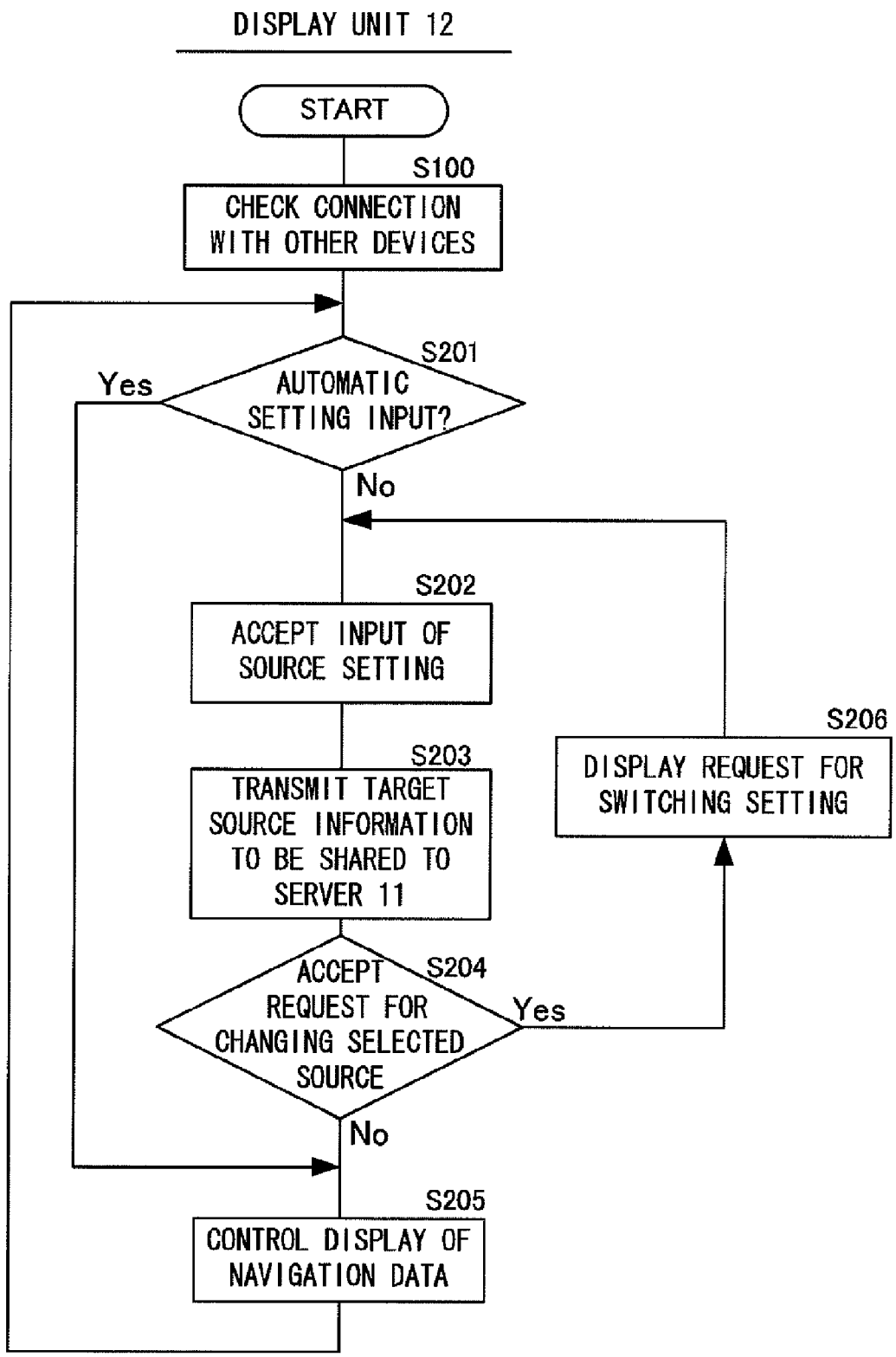
FIG. 3 is a flowchart showing a process flow of a display unit 12 upon the navigation data sharing process.
Figure 4:
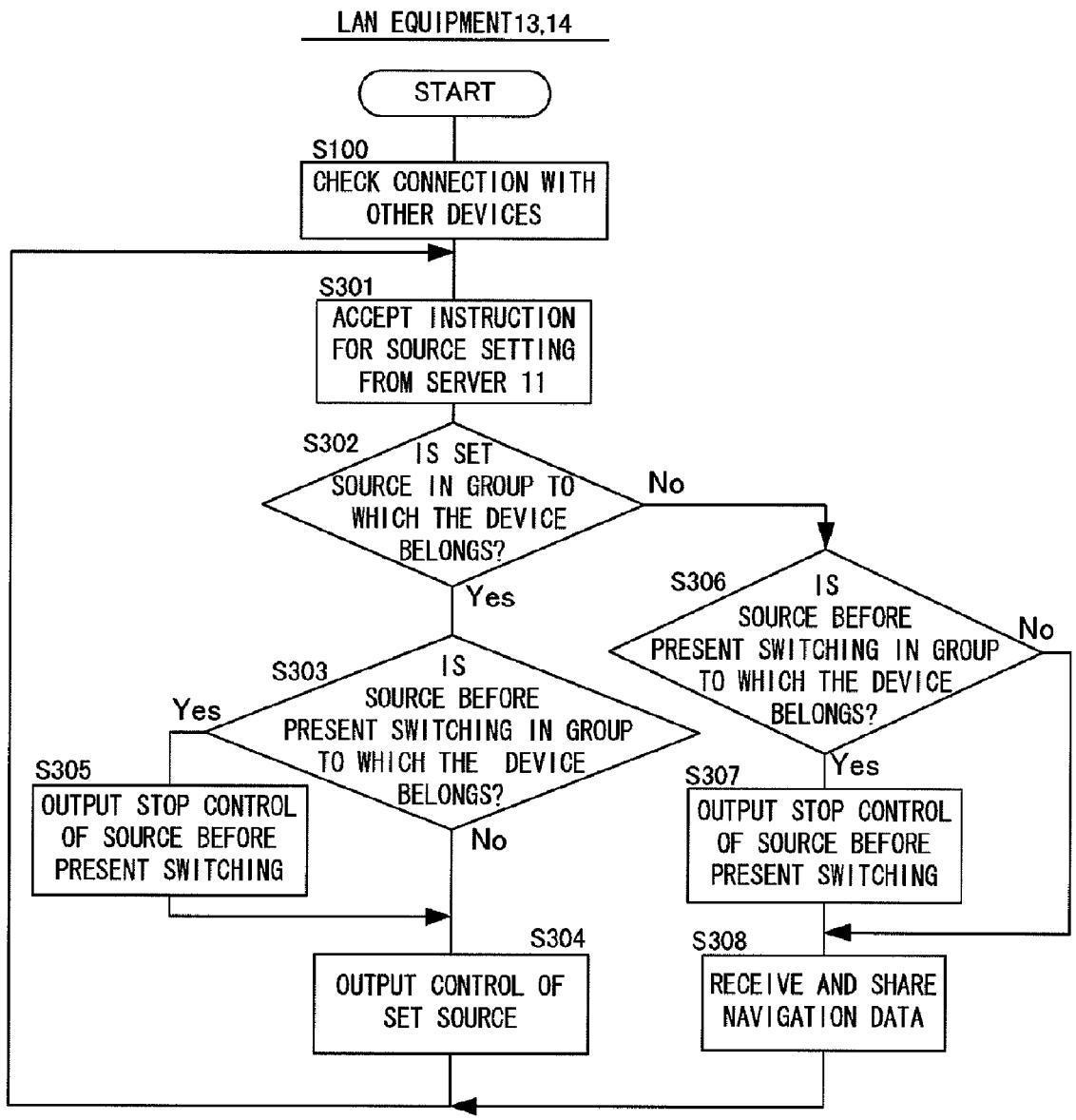
FIG. 4 is a flowchart showing a process flow of LAN instruments 13 and 14 upon the navigation data sharing process.
Figure 5:
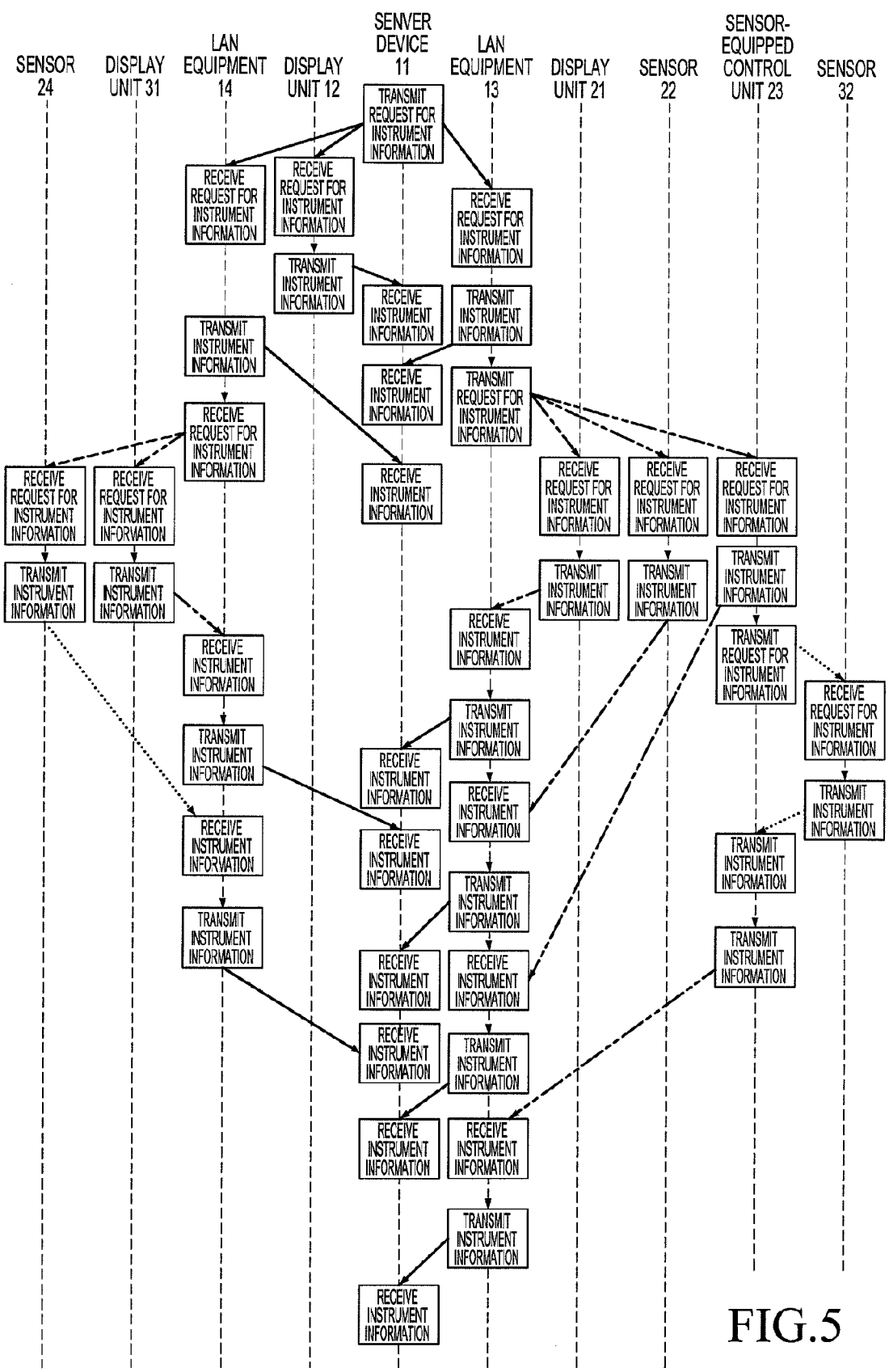
FIG. 5 is a system flow diagram showing a flow for obtaining classified-by-type information.

FIG. 2 is a flowchart showing a process flow of the server device 11 upon the navigation data sharing process. FIG. 3 is a flowchart showing a process flow of the display unit 12 upon the navigation data sharing process. FIG. 4 is a flowchart showing a process flow of the LAN instruments 13 and 14 upon the navigation data sharing process. FIG. 5 is a system flow diagram showing a flow for obtaining the classified-by-type information.

In FIGS. 2-4, first at S100, each of the server device 11, the display unit 12, the LAN instruments 13 and 14 that is connected to the first communication network 100 detects a connection status with other devices to which the device is connected. For example, in the configuration of FIG. 1, the server device 11 checks the connections with the display unit 12, and the LAN instruments 13 and 14 through the first communication network 100, and the display unit 12 checks the connections with the server device 11, and the LAN instruments 13 and 14 through the first communication network 100. The LAN instrument 13 checks the connections with the server device 11, the display unit 12, and the LAN instrument 14 through the first communication network 100, while checking the connections with the display unit 21, the sensor 22, and the sensor-equipped control unit 23 through the second communication network 201. At this point, the sensor-equipped control unit 23 also checks the connection with the sensor 32 through the serial cable 302. The LAN instrument 14 checks the connections with the sensor 24 through the third communication network 202, while checking the connection with the display unit 31 through the serial cable 301.

As shown in FIG. 5, the server device 11 obtains the individual IDs and the classified-by-type information of all of the vessel instruments in the vessel instrument network system.

First, the server device 11 transmits a request for instrument information to the display unit 12 and the LAN instruments 13 and 14 connected to the first communication network 100, as an instruction to transmit the instrument information including the individual ID and the classified-by-type information of the vessel instruments to the server device 11.

When the display unit 12 receives the request for instrument information from the server device 11, the display unit 12 then transmits its instrument information to the server device 11. The server device 11 then receives the instrument information from the display unit 12 to obtain the instrument information of the display unit 12.

When the LAN instrument 13 receives the request for instrument information from the server device 11, the LAN instrument 13 the transmits its instrument information to the server device 11. The server device 11 then receives the instrument information from the LAN instrument 13 to obtain the instrument information of the LAN instrument 13. The LAN instrument 13 also transmits the requests for instrument information to the display unit 21, the sensor 22, and the sensor-equipped control device 23 that are connected to the second communication network 201.

When the display unit 21, the sensor 22, and the sensor-equipped control device 23 receive the request for instrument information from the LAN instrument 13, they then transmit the instrument information to the LAN instrument 13. When the LAN instrument 13 receives these instrument information, the LAN instrument 13 then stores the instrument information, while converting the instrument information into the format of the first communication network 100 to transmit them to the server device 11. The server device 11 then receives the instrument information from the LAN instrument 13 to obtain the instrument information of the display unit 21, the sensor 22, and the sensor-equipped control device 23.

The sensor-equipped control device 23 transmits its instrument information to the LAN instrument 13, while transmitting the request for instrument information to the sensor 32 that is connected to the sensor-equipped control device 23 through the serial cable 302. When the sensor 32 receives the request for instrument information, the sensor 32 then transmits the instrument information to the sensor-equipped control device 23. Then, the sensor-equipped control device 23 converts the instrument information of the sensor 32 into the format of the second communication network 201 to transmit it to the LAN instrument 13. The LAN instrument 13 then converts the instrument information of the sensor 32 in the format of the second communication network 201 into the format of the first communication network 100 to transmit it to the server device 11. The server device 11 then receives the instrument information from the LAN instrument 13 to obtain the instrument information of the sensor 32.

When the LAN instrument 14 receives the request for instrument information from the server device 11, the LAN instrument 14 then transmits its instrument information to the server device 11. The server device 11 then receives the instrument information from the LAN instrument 14 to obtain the instrument information of the LAN instrument 14. The LAN instrument 14 then transmits its instrument information to the server device 11, while transmitting the request for instrument information to the sensor 24 connected to the third communication network 202.

When the sensor 24 receives the request for instrument information from the LAN instrument 14, the sensor 24 then transmits the instrument information to the LAN instrument 14. When the LAN instrument 14 receives the instrument information, the LAN instrument 14 then stores the instrument information, while converting the instrument information into the format of the first communication network 100 to transmit it to the server device 11. The server device 11 then receives the instrument information from the LAN instrument 14 to obtain the instrument information of the sensor 24.

The LAN instrument 14 transmits the request for instrument information to the display unit 31 that is connected to the LAN instrument 14 through the serial cable 301. When the display unit 31 receives the request for instrument information, the display unit 31 then transmits the instrument information to the LAN instrument 14. Then, the LAN instrument 14 converts the instrument information of the display unit 31 into the format of the first communication network 100 to transmit it to the server device 11. The server device 11 then receives the instrument information from the LAN instrument 14 to obtain the instrument information of the display unit 31.

According to the processes described above, the server device 11 can unify the management of the instrument information (e.g., the individual IDs, the classified-by-type information, etc.) of all of the vessel instruments in the vessel instrument network system where the different protocols mixedly exist.

[(1) Process of Server Device 11 for Navigation Data Sharing]

As described above, when the server device 11 obtains the instrument information from the vessel instruments, the server device 11 then accepts a selection of a navigation data sharing mode by a user (described later). For example, the server device 11 extracts a group of the vessel instruments (sensors) generating the same type of the navigation data (e.g., one instrument generates information on a cloud of fish, and another instrument also generates information on the cloud of fish) based on the instrument information of the vessel instruments in the entire network system. Then, the server device 11 transmits information on the group of the vessel instruments generating the same type of the navigation data, to the display unit 12. The display unit 12 then displays this information.

In this embodiment, the display unit 12 is provided with an operation input module for accepting a mode selection of the navigation data sharing. The mode selection of the navigation data sharing is inputted by a user on the display unit 12 (typically, with a touch-panel function), as will be described for S201 in FIG. 3. When the mode selection of the navigation data sharing is inputted by the user, the display unit 12 then transmits the mode selection data indicating whether it is for an automatic mode or a manual mode, to the server device 11. The server device 11 then receives the mode selection data, and detects whether the mode selection data is for an automatic mode or a manual mode at S101. If the received data is for the automatic mode ("Auto" at S101), the server device 11 then proceeds to S108 to start executing an automatic sharing process of the navigation data. On the other hand, if the mode selection data is for the manual mode ("Manual" at S101), the server device 11 then accepts an instruction for selecting a source to be shared (hereinafter, referred to as "source-to-be-shared information") at S102. Also at S102, when the source-to-be-shared information is accepted from the display unit 12, the server device 11 then selects a vessel instrument (sensor) to be shared based on the instrument information. At S103, the server device 11 generates an instruction to set the source to be shared (hereinafter, referred to as "sharing-source-setting instruction data") based on the types of the vessel instruments (sensors) to be set as the sharing target and the navigation data of the instrument, and then outputs it to the first communication network 100.

At S104, after the server device 11 instructs with the sharing-source-setting instruction data, the server device 11 then monitors the navigation data from the vessel instruments (sensors) instructed to be shared. If the server device 11 obtains the corresponding navigation data ("Yes" at S105), the server device 11 then maintains the monitoring of the navigation data from the vessel instruments instructed to be shared until accepting the next mode selection data or the next source-to-be-shared information. On the other hand, if the server device 11 does not obtain the corresponding navigation information ("No" at S105), at S106, the server device 11 then outputs a request for changing the selected source, to the display unit 12. Then, if the server device 11 does not accept the selection of the automatic mode from the display unit 12 ("No" at S107), the server device 11 then returns to S102 to again wait for the instruction for selecting the source to be shared. On the other hand, if the server device 11 accepts the selection of the automatic mode from the display unit 12 ("Yes" at S107), the server device 11 then switches to (or select) the automatic mode.

When the automatic mode is selected, the server device 11 then selects a vessel instrument from the plurality of the vessel instruments that generate the same type of the navigation data, in accordance with default settings based on the instrument information on the vessel instruments in the entire network system. At S108, the server device 11 generates the sharing-source-setting instruction data for instructing the selected vessel instrument to output it to the first communication network 100.

Here, as an example of the default settings, there may be a method in which the individual IDs of the instrument information are arranged in an ascending or descending order, and then the vessel instrument with the first individual ID is selected. Alternatively, there may be a method in which a function module for detecting quality of each of the navigation data (e.g., accuracy of the data, or updating cycle of the data) is provided to the server device 11, and the vessel instrument with the highest quality of the navigation data calculated by the function module is selected. In such a method based on the quality of the navigation data, because the vessel instrument generating the navigation data with the highest quality is automatically selected, the high-reliability vessel instrument network system can be established.

At S109, the server device 11 monitors the navigation data from the vessel instrument (sensor) selected as a target for the sharing instruction. If the server device 11 obtains the corresponding navigation data ("Yes" at S110), the server device 11 maintains the monitoring of the navigation data from the vessel instrument instructed to be shared. On the other hand, if the server device 11 does not obtain the corresponding navigation data ("No" at S110), at S111, the server device 11 selects another vessel instrument from the other vessel instruments generating the same type of the navigation data, and then generates the sharing-source-setting instruction data for instructing the selected vessel instrument to output it to the first communication network 100.

Here, as a rule for switching the selection, if the above-described ascending-order method is applied, the next highest vessel instrument is assigned. Alternatively, if the above-described method using the quality of the navigation data is applied, the vessel generating the navigation data with the next highest quality is assigned.

[(2) Process of Display Unit 12 for Navigation Data Sharing]

Now, referring to FIG. 3, when the display unit 12 detects the connection statuses with the other devices at S100, the display unit 12 then obtains the information on the group of the vessel instruments generating the same type of the navigation data, from the server device 11, and then the display unit 12 displays the connection statuses on a display module (not illustrated). If the display unit 12 accepts an operation input for the automatic mode by a user ("Yes" at S201), the display unit 12 then transmits the mode selection data indicating the automatic mode to the server device 11. At S205, the display unit 12 then receives the navigation data from the vessel instruments instructed by the sharing-source-setting instruction data to perform a display control based on the navigation data.

On the other hand, if the display unit 12 accepts an operation input for the manual mode by a user ("No" at S201), at S202, the display unit 12 then accepts an input for the source setting by the user, and at S203, it then transmits the source-to-be-shared information to the server device 11. The display unit 12 then receives the navigation data from the vessel instruments instructed to be shared, and if the display unit 12 does not receive a request for changing the selected source from the server device 11 ("No" at S204), at S205, the display unit 12 then performs the display control based on the navigation data. On the other hand, if the display unit 12 receives the request for changing the selected source from the server device 11 ("Yes" at S204), at S206, the display unit 12 then displays an indication of a request for switching the source settings on an indicator. The display unit 12 then returns to S202 to again accept a new input for the source settings.

[(3) Process of LAN Instruments 13 and 14 for Navigation Data Sharing]

Now, referring to FIG. 4, when the LAN instruments 13 and 14 detects the connection statuses with the other devices at S100, then, at S301, the LAN instruments 13 and 14 accept the sharing-source-setting instruction data from the server device 11 to detect whether the source to be set for sharing exists in a group to which the instrument belongs. For example, in the case of the LAN instrument 13 of FIG. 1, it detects whether the source to be set for sharing corresponds to any one of the LAN instrument 13, the display unit 21, the sensor 22, the sensor-equipped control unit 23, and the sensor 32. Alternatively, in the case of the LAN instrument 14, the LAN instrument 14 detects whether the source to be set for sharing corresponds to any one of the LAN instrument 14, the sensor 24, and the display unit 31.

If the LAN instrument 13 (or 14) detects that the source to be set for sharing exists in the group to which the instrument belongs ("Yes" at S302), the LAN instrument 13 (or 14) detects whether a source before the present switching is in the group to which the instrument belongs. If the LAN instrument 13 (or 14) detects that the source before the present switching is in the group to which the instrument belongs ("Yes" at S303), at S305, the LAN instrument 13 (or 14) then performs a stopping control of outputting of the navigation data from the source before the present switching. Here, the output stopping control may be such that the output from the source before the present switching is actually stopped, or the LAN instrument 13 (or 14) stops the output to the first communication network 100 and stops the sharing in the group to which the instrument belongs. If the LAN instrument 13 (or 14) detects that the source before the present switching is not in the group to which the instrument belongs ("No" at S303), or when the LAN instrument 13 (or 14) stops the output from the source before the present switching at S305, then at S304, the LAN instrument 13 (or 14) sets to share the navigation data from the source to be set for sharing, in the group to which the instrument belongs, and, the LAN instrument 13 (or 14) then outputs it to the first communication network 100.

If the LAN instrument 13 (or 14) detects that the source to be set for sharing does not exist in the group to which the instrument belongs ("No" at S302), the LAN instrument 13 (or 14) then detects whether the source before the present switching is in the group to which the instrument belongs. If the LAN instrument 13 (or 14) detects that the source before the present switching is in the group to which the instrument belongs ("Yes" at S306), at S307, the LAN instrument 13 (or 14) then performs the output stopping control of the navigation data from the source before the present switching. As described above, the output stopping control may also be configured such that the output from the source before the present switching is actually stopped, or the LAN instrument 13 (or 14) stops the output to the first communication network 100 to stop sharing in the group to which the instrument belongs. If the LAN instrument 13 (or 14) detects that the source before the present switching is not in the group to which the instrument belongs ("No" at S306), or when the LAN instrument 13 (or 14) stops the output from the source before the present switching at S307, then at S308, the LAN instrument 13 (or 14) controls to share the navigation data received through the first communication network 100 in the group to which the instrument belongs, with the instrument 13 (or 14) as an output source of the navigation data.

Next, a particular example of the sharing of the navigation data by the manual input will be described in detail with reference to FIG. 6. In the following, a case in which the source of the navigation data to be shared is switched from the sensor 22 to the sensor 24, in the configuration of the vessel instrument network system of FIG. 1, is described as an example.

Figure 6:
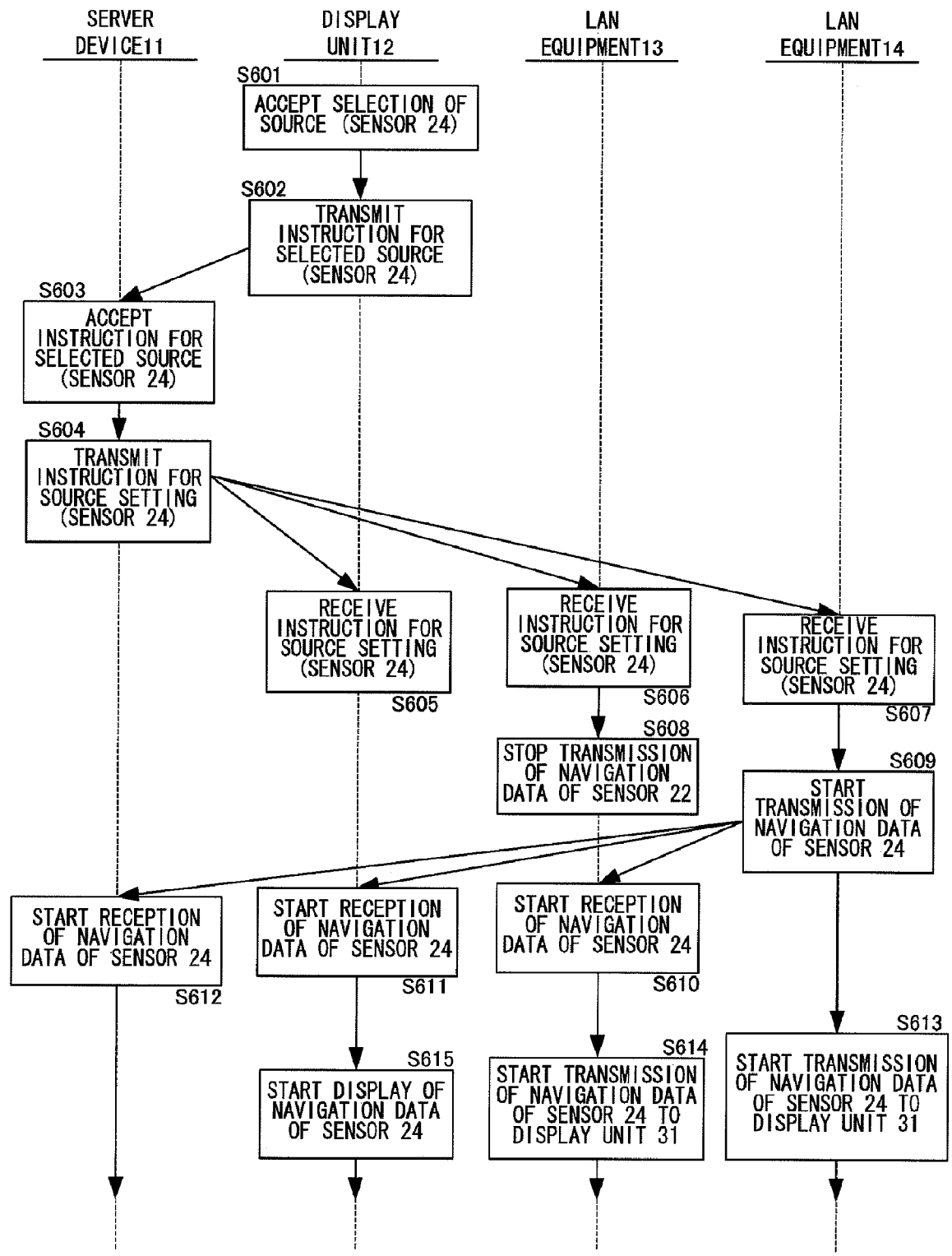
FIG. 6 is a system flow diagram showing a flow for sharing navigation data by a manual input.

FIG. 6 is a system flow diagram showing a flow for sharing the navigation data by the manual input.

First, at S601, when a user performs a selection operation to share the navigation data of the sensor 24, then at S602, the display unit 12 detects the user's operation to transmit an instruction to assign the sensor 24 as the selected source (the sharing-source-setting instruction data) to the server device 11.

Next, at S603, the sever device 11 receives the instruction, and then, at S604, it transmits the sharing-source-setting instruction data for the sensor 24 to the display unit 12 and the LAN instruments 13 and 14 through the first communication network 100.

At S605, S606, and S607, the display unit 12 and the LAN instruments 13 and 14 receive the sharing-source-setting instruction data for the sensor 24, respectively.

Next, at S608, upon the reception of the sharing-source-setting instruction data, the LAN instrument 13 detects, based on the sharing-source-setting instruction data, that the sensor 22 in the group to which the instrument belongs outputs the same type of navigation data as that of the sensor 24, and the LAN instrument 13 then stops the output and transmission of the navigation data from the sensor 22.

At S609, the LAN instrument 14 starts output and transmission of the navigation data from the sensor 24 in the group to which the instrument belongs, based on the sharing-source-setting instruction data.

At S610, S611, and S612, the server device 11, the display unit 12, and the LAN instrument 13 start receiving the navigation data of the sensor 24 from the LAN instrument 14, respectively.

Here, the server device 11 continuously monitors the navigation data. At S615, the display unit 12 displays information based on the navigation data of the sensor 24.

At S614, the LAN instrument 13 provides the navigation data of the sensor 24 to the display unit 21 to which the LAN instrument 13 is connected through the second communication network 201, as an output source. Then, the display unit 21 displays information based on the navigation data.

At S613, the LAN instrument 14 provides the navigation data of the sensor 24 to the display unit 31 to which the LAN instrument 14 is connected through the serial cable 301. Then, the display unit 31 displays information based on the navigation data.

As described above, the navigation data of the sensor 24 can be shared to display on all of the display units 12, 21, and 31 in the vessel instrument network system. In addition, because the navigation data of a sensor (source) manually selected by the user is shared, the user's desired optimum navigation data can be shared in the vessel instrument network system.

Next, a particular example of the sharing of the navigation data by the automatic input will be described with reference to FIG. 7. In the following, a case in which the source of the navigation data to be shared is set to the sensor 22 as default settings, in the configuration of the vessel instrument network system as shown in FIG. 1, will be described as an example.

Figure 7:
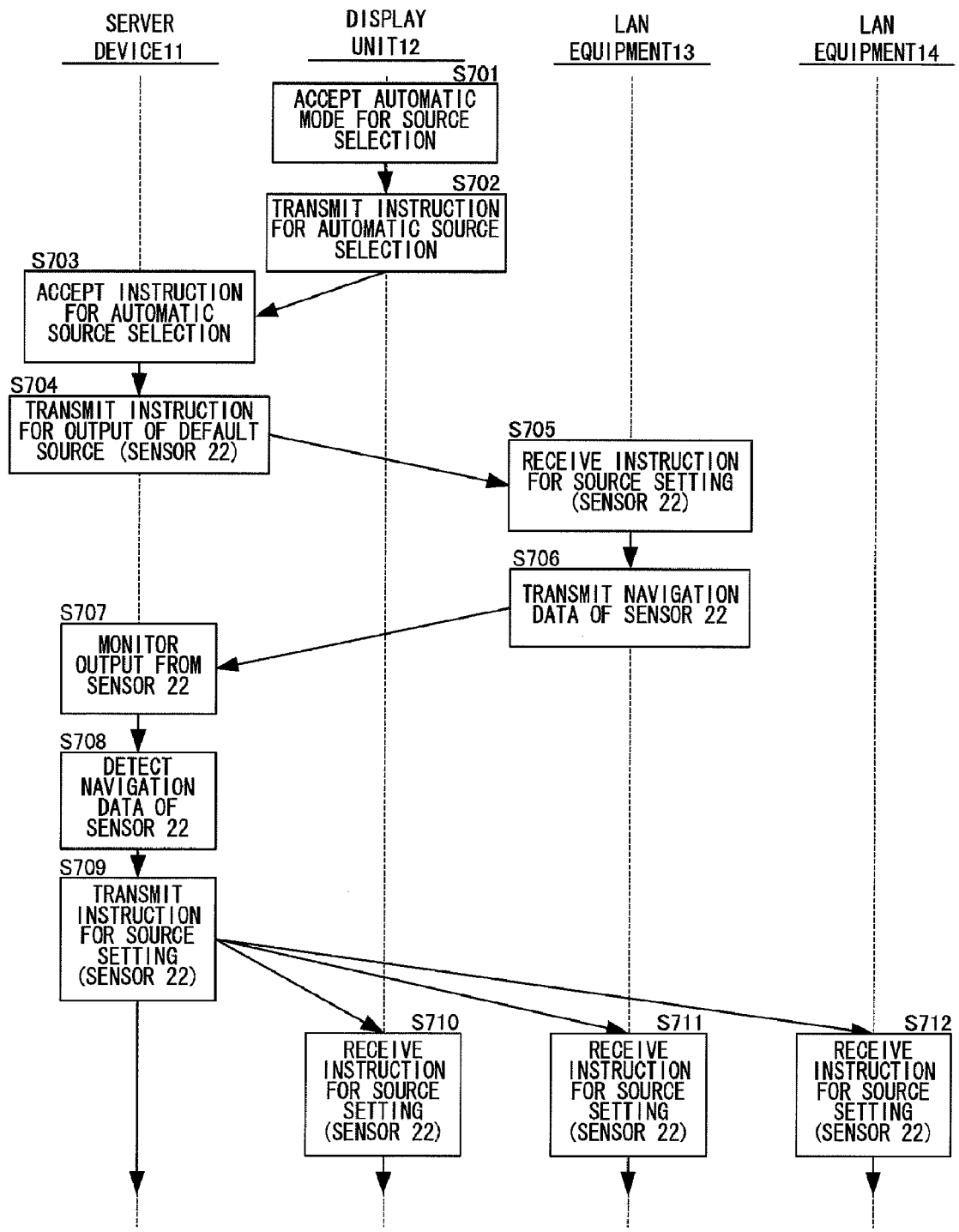
FIG. 7 is a system flow diagram showing a flow for automatically sharing the navigation data.

FIG. 7 is a system flow diagram showing a flow for automatically sharing the navigation data.

First, at S701, when a user performs a selection operation to automatically share the navigation data, then at S702, the display unit 12 detects this user's operation to transmit an instruction to set the source selection automatic mode (mode selection data or sharing-source-setting instruction data) to the server device 11.

At S703, the server device 11 then receives this instruction. Then, at S704, the server device 11 transmits through the first communication network 100 the sharing-source-setting instruction data for the sensor 22 as the default settings, to the LAN instrument 13 that is a data input/output gate between the first communication network 100 and the sensor 22.

At S705, when the LAN instrument 13 receives the sharing-source-setting instruction data for the sensor 22, then at S706, the LAN instrument 13 starts outputting and transmitting of the navigation data of the sensor 22 in the group to which the instrument belongs, based on the sharing-source-setting instruction data.

At S707, the server device 11 monitors the navigation data of the sensor 22, and at S708, if the server device 11 detects that the navigation data is outputted, then at S709, the server device 11 transmits the sharing-source-setting instruction data for the sensor 22 to the display unit 12 and the LAN instruments 13 and 14 through the first communication network 100.

At S710, S711, and S712, the display unit 12 and the LAN instruments 13 and 14 receive the sharing-source-setting instruction data for the sensor 22, and then share the navigation data of the sensor 22 in a similar manner to the manual input as described above, respectively.

By performing such a process described above, without the user performing the complicated operations, such as the user manually comparing each of the navigation data, the navigation data can be automatically shared in the vessel instrument network system.

Figure 8:
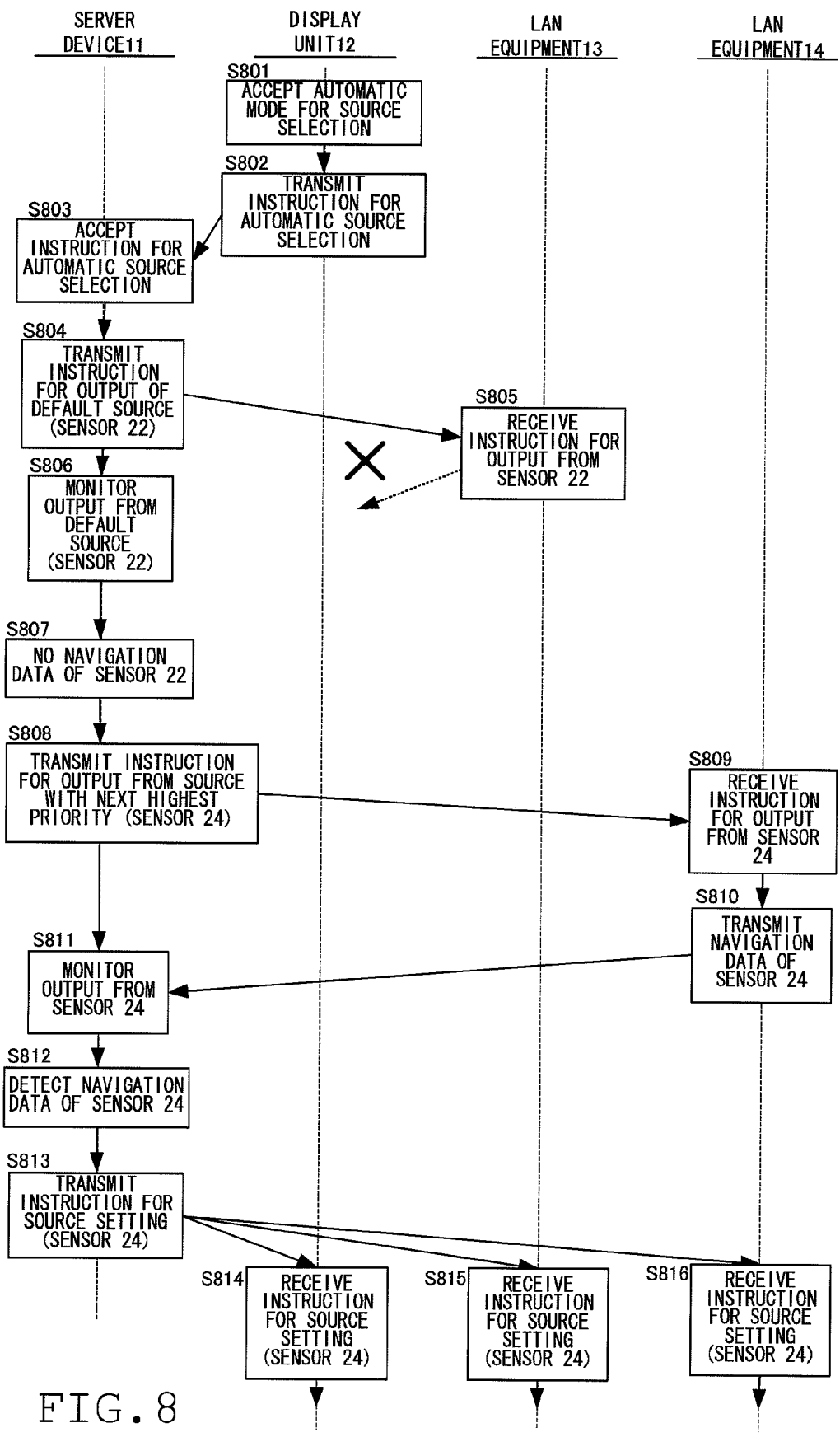
FIG. 8 is a system flow when an output from an once-assigned source (sensor) is not detected, and is automatically switched.

In the description above, although the case in which the output from the assigned source (sensor) is detected by a single instruction has been illustrated, it may be possible so that the output is not detected by a single instruction. FIG. 8 shows a case in which the output from the source (sensor) that has been once assigned cannot be detected and, thus, the source (sensor) can be automatically switched.

At S801, when a user performs a selection operation for automatically sharing the navigation data, then at S802, the display unit 12 detects this user's operation to transmit an instruction to set it in the source selection automatic mode (the mode selection data) to the server device 11.

At S803, the server device 11 receives this instruction. Then, at S804, the server device 11 transmits through the first communication network 100 the sharing-source-setting instruction data for the sensor 22 as the default settings, to the LAN instrument 13 that is a data input/output gate between the first communication network 100 and the sensor 22.

At S805, when the LAN instrument 13 does not output/transmit the navigation data of the sensor 22 for some reason, such as being unable to receive this sharing-source-setting instruction data, even if the server device 11 monitors the navigation data of the sensor 22 at S806, the navigation data cannot be detected at S807. Thus, at S808, the server device 11 transmits the sharing-source-setting instruction data for the sensor 24 based on the next highest priority (selected priority as described above) to the LAN instrument 14 through the first communication network 100.

At S809, when the LAN instrument 14 receives the sharing-source-setting instruction data for the sensor 24, then at S810, the LAN instrument 14 starts outputting and transmitting of the navigation data of the sensor 24 in the group to which the instrument belongs, based on the sharing-source-setting instruction data.

At S811, the server device 11 then monitors the navigation data of the sensor 24, and at S812, when the server device 11 detects that the navigation data is outputted, then at S813, the server device 11 transmits the sharing-source-setting instruction data for the sensor 24 to the display unit 12 and the LAN instruments 13 and 14 through the first communication network 100.

At S814, S815, and S816, the display unit 12 and the LAN instruments 13 and 14 receive the sharing-source-setting instruction data for the sensor 24, and then share the navigation data of the sensor 24 as similar to the manual input described above, respectively.

By performing such a process described above, the navigation data can be further reliably shared. At this point, as shown in the system flow of FIG. 8, The sensor (source) is switched to the one with a data input/output gate to the first communication network 100 different from the precious sensor (source) before the switching, and thereby the switching can be further reliably performed.

Although the functions of the LAN instruments 13 and 14 have not been described in detail in the above description, the LAN instruments 13 and 14 may only perform the protocol conversion as described above, or may have a built-in sensor to function as one of the sensors. Similarly, the server device 11 or the display unit 12 may have the built-in sensor to function as one of the sensors. Thus, again, for a vessel instrument connected to both upper-level and lower-level communication networks, the vessel instrument may only perform the protocol conversion, or further include other function(s), such as of the display and the sensor.

The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A vessel instrument network system in which a plurality of vessel instruments including a plurality of sensors are connected through an electrical communication network, the plurality of sensors generating the same type of navigation data, the vessel instrument network system comprising:
   a first communication network for realizing one-to-many communication;
   a first group of the plurality of the vessel instruments connected with each other through the first communication network; and
   a second group of the plurality of the vessel instruments connected to the first communication network with a protocol that is different from that of the first communication network, the vessel instrument of the first group being a data input/output gate between the vessel instruments of the second group and the first communication network;
   wherein at least one of the vessel instruments of the first group has a server function;
   wherein the vessel instruments of the first group obtain identification information and types of outputable navigation data of the vessel instruments of the second group that use the vessel instruments of the first group as the data input/output gates, and the instrument having the server function obtains identification information and types of outputable navigation data of the vessel instruments;
   wherein the instrument having the server function selects one of the sensors generating the same type of the navigation data, and outputs an instruction to share the navigation data of the selected sensor, through the first communication network; and
   wherein the vessel instrument of the first group provides the sharing instruction to the vessel instruments of the second group that use the vessel instrument of the first group as the data input/output gate.

2. The vessel instrument network system according to claim 1, wherein, if the vessel instrument of the first group transmits the same type of the navigation data as the sensor instructed to be shared, through the first communication network, the vessel instrument of the first group stops the transmission of the navigation data; and
   wherein, when the vessel instrument of the first group detects that the sensor instructed to be shared is the vessel instrument of the second group that use the vessel instrument of the first group as the data input/output gate, the vessel instrument of the first group transmits the navigation data from the sensor instructed to be shared through the first communication network.

3. The vessel instrument network system according to claim 1, wherein at least one of the vessel instruments including the instrument having the server function includes an operation input module for accepting a user's operation input of a selection of the sensors;
   wherein, when the operation input module accepts the operation input selecting one of the sensors generating the same type of the navigation data, the operation input module causes the at least one of the vessel instruments having the server function to obtain the sensor selecting information; and
   wherein the at least one of the vessel instruments having the server function instructs the sharing based on the obtained sensor selecting information.

4. The vessel instrument network system according to claim 1, wherein the instrument having the server function includes a navigation data quality detecting module for detecting qualities of the same type of the navigation data; and
   wherein the instrument having the server function instructs to share the navigation data with the highest quality.

5. The vessel instrument network system according to claim 1, wherein the instrument having the server function monitors the navigation data from the sensor instructed to be shared, and, if the instrument having the server function cannot obtain the navigation data over a predetermined time period, the instrument having the server function switches the sensor from the sensor instructed to be shared to another sensor generating the same type of the navigation data as a new sensor instructed to be shared.

6. The vessel instrument network system according to claim 5, wherein the instrument having the server function selects the another sensor instructed to be shared, from the vessel instruments of the second group other than the group to which the previous sensor instructed to be shared belongs.

* * * * *